United States Patent Office 3,502,457
Patented Mar. 24, 1970

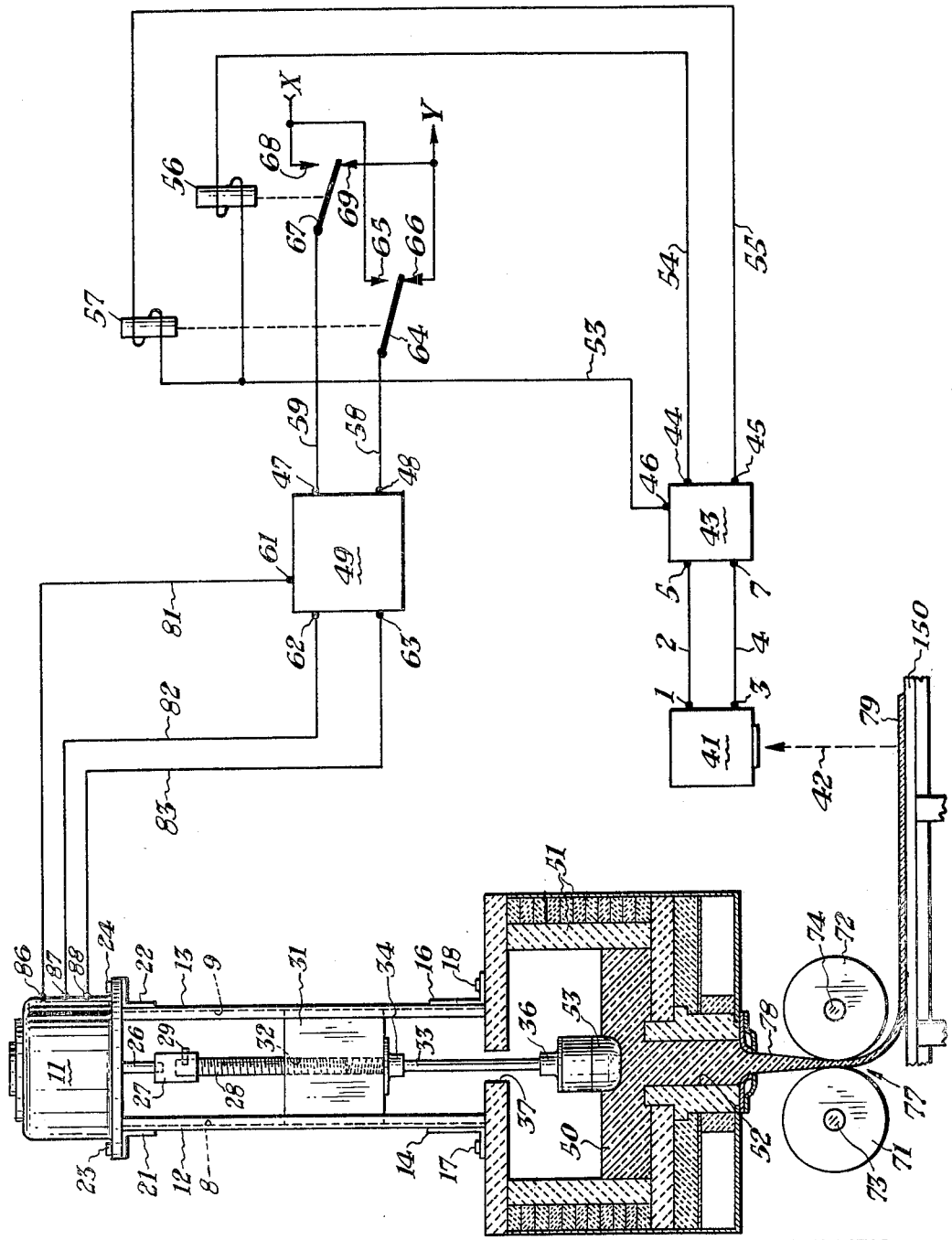

3,502,457
AUTOMATIC SYSTEM FOR CONTROLLING THE WIDTH OF A GLASS RIBBON
Arthur T. Bublitz and Raymond J. Mouly, Corning, N.Y., assignors to Corning Glass Works, Corning, N.Y., a corporation of New York
Filed Apr. 5, 1965, Ser. No. 445,374
Int. Cl. C03c 13/00, 17/00
U.S. Cl. 65—161                9 Claims

ABSTRACT OF THE DISCLOSURE

A system for continuously controlling the width of a ribbon of viscous molten material such as molten glass flowing from an outlet of a furnace or forehearth by automatically adjusting the flow rate of said material from said orifice in accordance with signals derived by a non-contacting type of gage which continuously senses said ribbon width, such signals representing deviations of such width from a preset valve therefore and used for controlling apparatus for readjusting said flow rate in accordance with such deviations.

---

The present invention relates to an automatic control system and more specifically to a system for continuously automatically controlling according to a preset desired value, the width or breadth of a ribbon of viscous molten material permitted to flow under the influence of gravity from an outlet orifice of a furnace or forehearth. Still more particularly, the invention relates to a system for automatically and continuously controlling one of the dimensions taken at right angles to the length of a flowing ribbon of viscous molten material, such ribbon flowing under the influence of gravity from an outlet of a furnace or forehearth and said dimension being controlled, in accordance with a preselected size therefor, by automatically adjusting the rate of flow of said material from said orifice.

There is shown and described, for example, in Letters Patent of the United States 1,790,397, issued Jan. 27, 1931 to William J. Woods and David E. Gray and entitled Glass-Working Machine, apparatus for and a method of forming, from a continuous ribbon of molten or plastic glass and at an extremely rapid rate, a series or succession of blown glass articles. As is obvious, the width of said glass ribbon supplied to said apparatus must be precisely controlled or regulated in accordance with a selected set value therefor so that the apparatus can accept and handle such ribbon during the forming of the glass articles therefrom.

In practicing the invention disclosed in said patent, molten glass flows through an issuing orifice in the bottom of a forehearth under the influence of gravity, the rate of such flow being regulated by a needle or regulator provided in said forehearth and vertically movable through the pool of molten glass in such forehearth to completely close off the inner end of the glass issuing orifice or to open such end of the orifice to varying degrees. The degree of opening of the inner end of the glass issuing orifice regulates, of course, the rate of flow of the molten glass from the forehearth and through such orifice to the ribbon forming means which comprises a pair of forming rolls disposed below the glass issuing orifice. The distance at which said forming rolls are spaced apart controls the thickness of the ribbon formed by such rolls and the rolls are arranged so that such distance can be regulated according to the ware or glass articles to be made during any period of operation of the apparatus. Accordingly, the rate of flow of molten glass to the forming rolls must be constantly regulated in accordance with the roll spacing so that such rolls may form a plastic glass ribbon of constant thickness and width. It is thus apparent that the thickness of the formed glass ribbon is dependent in said roll spacing and the width of such ribbon is dependent on the rate of flow of the molten glass to such forming rolls, such rate being adjusted, in accordance with each different spacing for said rolls, so as to provide a predetermined constant width of ribbon in accordance with each such spacing.

It is, accordingly, one object of the present invention to precisely control the flow of a molten material from a furnace or forehearth in accordance with a desired or preselected parameter for the forming of such material.

It is another object of the invention to provide a control system for regulating the rate of flow of a molten material from a furnace, such system being reliable and requiring a minimum of maintenance.

It is a third object of the present invention to provide a control system for controlling the rate of flow of molten or plastic glass from a forehearth according to a desired dimension for a glass ribbon being formed from such molten glass.

In accomplishing the above objects of the invention there is provided a non-contacting type of gage which continuously senses the width of the plastic glass ribbon being formed and derives signals representing any deviations of such width from a preset value therefore, said signals being processed, handled and supplied to apparatus for readjusting the width of the ribbon in accordance with said deviations from said preset value.

Other objects and characteristic features of the invention will become apparent as the description proceeds.

The invention will best be understood with reference to the single drawing figure which comprises, a vertical partially cross-sectional view of a forehearth and apparatus associated therewith for controlling the flow of molten glass from an outlet orifice in the bottom of the forehearth, and a schematic view in block diagram form of the gaging and control system for regulating said apparatus in accordance with the invention.

Referring to the drawing in detail, there is shown on the lefthand side thereof a forehearth 51 containing a pool 50 of molten glass and having an outlet or glass issuing orifice 52 in its bottom, the rate of flow of molten glass through such orifice being controlled by a regulator or needle 53 vertically movable into and out of an orifice blocking relationship with the inner end of the orifice. There is disposed below orifice 52 two forming rolls 71 and 72 which turn respectively around shafts 73 and 74 and are spaced apart to create a forming space 77 therebetween. The glass 78 issuing from the outlet orifice 52 passes through said forming space and is formed into a ribbon 79 therein. Ribbon 79 is supplied to a conveyor 150 and is transported thereby to additional forming apparatus not shown. As is obvious the thickness of the ribbon depends on the spacing of rolls 71 and 72.

The apparatus thus far described forms, per se, no part of the present invention but corresponds to apparatus shown in FIGS. 1 and 11 of the aforesaid patent to Woods and Gray, the reference characters 51, 52, 53, 71, 72, 73, 74, 77, 78, 79 and 150 corresponding to the respectively identical reference characters appearing in FIGS. 1 and 11 of said patent. For a more complete understanding of the structure and operation of the apparatus thus far discussed, reference is made to said patent and especially to FIGS. 1 and 11 of such patent and the description therein pertaining to such drawing figures.

Referring further to the single drawnig figure in the present case, motor means comprising an electrically driven reversible stepping motor 11 is provided for lowering or raising regulator 53 to respectively fully close off or open to varying degrees the inner end of outlet orifice 52. Such variable opening of the orifice regulates, as previously mentioned, the rate of flow of glass from the outlet orifice and to rolls 71 and 72. Motor 11 is supported above the top of forehearth 51 by a pair of upright legs 12 and 13 mounted on the top of the forehearth by a pair of L-shaped angles 14 and 16 which are affixed to the bottom ends of said legs in any convenient manner and which are secured as by bolts 17 and 18 to the forehearth top and adjacent an opening or orifice 37 extendig through such top. A second pair of L-shaped angles 21 and 22 are affixed to the upper ends of legs 12 and 13, respectively, as by welding for example, and motor 11 is removably secured to such angles by bolts such as 23 and 24.

Legs 12 and 13 are respectively provided with channels 8 and 9 extending along the length of the facing sides of such legs. Such channels provide a trackway for guidance of a support block 31 which has its outer edges snugly fitting but slidably movable in such channels for sliding movement of the support block therewithin and therealong. Regulator 53 is suspended from the bottom of support block 31 by a shaft 33 which extends through said orifice 37 and which has its upper and lower ends connected to the bottom of support block 31 and the top of regulator 53, respectively, by flange parts such as 34 and 36, respectively.

The output shaft 26 of motor 11 extends into and is keyed in any convenient manner in the upper end of a sleeve type coupling 27. The upper end of a threaded shaft 28 extends into the lower end of coupling 27 and is keyed thereto as by a shear pin 29 extending through the sidewall of said coupling and into a hole provided in the upper end of the threaded shaft. Support block 31 is provided with a hole or opening 32 which extends vertically therethrough and which is provided with threads which cooperate with the threads on shaft 28, such shaft being screwed into said opening. It is thus apparent that, by rotation thereof, shaft 28 is movable through said opening, and block 31 may thus be raised or lowered in its trackway according to the direction of rotation of shaft 28. The raising or lowering of support block 31 obviously also raises or lowers shaft 33 and regulator 53.

As previously mentioned, motor 11 is a reversible stepping motor and is, for example, of a type whose output shaft completes one revolution for each series of 200 pulses of direct current supplied across its control windings in a repetitive four step sequence of varying polarities. That is to say, a series of 200 pulses of direct current of a first prescribed repetitive four step sequence of varied polarities supplied across the control windings of the motor causes the output shaft of the motor to make one revolution in a first direction while a series of 200 pulses of direct current of a second prescribed repetitive four step sequence of varied polarities supplied across said control windings causes the output shaft of the motor to make one revolution in the opposite or reverse direction. A series of less than 200 pulses will, of course, cause the output shaft of the motor to make only a part of a revolution, such partial revolution being directly proportional to the number of pulses supplied across the control windings of the motor. Stepping motors such as motor 11 are well known and such motor may, for example, be a stepping motor of the type manufactured and sold by The Superior Electric Company, Bristol, Conn. and decribed in Bulletin SS459 published by such company. The internal structure of motor 11 is not shown in the drawings but it is pointed out that the output shaft 26 of the motor may be caused to rotate in first or second directions, as discussed above, according as direct current pulses of different polarities are respectively supplied from a center tapped direct current source, and in a first or a second prescribed four step sequence, to input terminals 87 and 88 of such motor and thereby to first ends of the control windings thereof. Terminal 86 on such motor is connected, as hereinafter discussed, to the center tap of said direct current source and to the second ends of both of the control windings of motor 11.

Refference character 41 designates an infrared comparison micrometer or gage which periodically scans across the width of ribbon 79, such micrometer or gage, as indicated at 42, receiving the infrared rays emitted by the hot ribbon 79. In actuality, reference 41 designates two major components shown in a single block diagram form, one such component being the scanner which scans the width of the ribbon 79 and the other component being an electronic control unit which processes the signals from the scanner to produce an output representative of deviations of the width of the ribbon 79 from a preset desired width therefor, such preset width being established by setting a control dial on the electronic control unit. While the electronic unit may be located remote from the scanner, both components form the complete gage and, for purpose of simplification of the drawings, both of the units are represented by the single block designated 41.

Infrared gages for gaging the dimensions of hot bodies are well known and, therefore, the details of gage 41 are not shown in the drawings since the gage, per se, forms no part of the present invention. Gage 41 may, for example, be of the type manufactured and sold by Barnes Enginnering Company, 30 Commerce Road, Stamford, Conn., such micrometer being designated as Model 17–110 Infrared Comparison Micrometer and being described in Instruction Manual 17–110 published by said company. It is sufficient for the purposes of the present description to point out that, when the width of ribbon 79 being scanned by the gage deviates from the desired preset width therefor, the gage produces a direct current output signal representative of such deviation, such signal being supplied across output terminals 1 and 3 of gage 41. The polarity of said output signal represents the direction of the deviation in the width of the ribbon, that is, whether such width is less or greater than the preset therefor, and the voltage magnitude or value of the signal is proportional to or representative of the amount or extent of said width deviation. If, for example, the output signal supplied across terminals 1 and 3 of gage 41 is of a first relative polarity, the width of ribbon 79 is too small and, if such signal is of the opposite relative polarity, the width of ribbon 79 is too great. The value in volts of the output signal represents the amount of the deviation in width of the ribbon from the preset width therefor.

Output terminals 1 and 3 of gage 41 are connected by electrical conductors 2 and 4, respectively, to input terminals 5 and 7, respectively, of a control unit 43 which products a square wave direct current output pulse having a width or time duration proportional to an input signal supplied to input terminals 5 and 7 of the control unit. A first relay 56 has one end of its control winding connected over an electrical conductor 54 to an output terminal 44 on control unit 43, and a second relay 57 has one end of its control winding connected over an electrical conductor 55 to an output terminal 45 on said control unit. The second ends of the control windings of the relays connect to each other and are then connected over a common electrical conductor 53 to a common output terminal 46 on control unit 43. The square wave output pulses of control unit 43 are supplied across output terminals 44 and 46, or 45 and 46, according to the relative polarity and magnitude of the input signals supplied across input terminals 5 and 7 of such unit. It is thus apparent that one of the relays 56 or 57 is energized for the time duration of each output pulse from control unit 43, which one of the relays that is energized being dependent on the polarity of the signal supplied to the control unit, and such polarity in turn being dependent on the direction of deviation in width of the ribbon 79, such deviation being detected by gage 41.

Control unit 43 may, for example, be a 10871 Directional Impulse Adjusting Type Control Unit (Series 60) manufactured and sold by Leeds & Northrup Company, Philadelphia, Pa., such unit being described in a publication 177101 published by such company. Terminals 5, 7, 44, 45 and 46 on control unit 43 respectively correspond to terminals MC, 63, RH, RL and L4 on said control unit of the Leeds & Northrup Company.

A digital amplifier 49 is provided, and contacts on the above-mentioned relays 56 and 57 supply direct current input pulses of first and second relative polarities across input terminals 47 and 48 on such amplifier. Such input pulses are square wave pulses having a width or time duration proportional to the output pulses from control unit 43. A first circuit for supplying an input pulse of a first polarity across input terminals 47 and 48 of amplifier 49 extends from terminal X of a source of direct current (not shown in the drawings for purpose of simplification thereof) over contacts 67–68 of relay 56 in it energized or picked-up condition, over electrical conductor 59 and thence through the internal circuitry of amplifier 49 to output terminal 48 thereof, over electrical conductor 58 and thence over contacts 64–66 of relay 57, in the deenergized or release condition thereof, and to terminal Y of said direct current source. A second circuit for supplying an input pulse of a second or the opposite polarity across input terminals 47 and 48 of amplifier 49 extends from terminal X of said current source, over contacts 64–65 of relay 57 in its energized condition and thence in the reverse direction over the above traced circuit and over contacts 67–69 of relay 56, in its deenergized condition, to terminal Y of the direct current source. It is thus apparent that electrical energy of a first or second polarity is supplied input terminals 47 and 48 of amplifier 49 according as relay 56 or 57 is energized.

Amplifier 49 incorporates a center-tapped source of direct current, the positive and negative terminals of which are internally selectively connected to output terminals 62 and 63 of the amplifier. An output terminal 61 on the amplifier is connected internally to the center tap of such source of direct current. Output terminals 61, 62 and 63 are connected over electrical conductors 81, 82 and 83, respectively, to input terminals 86, 87 and 88, respectively, of motor 11, previously discussed. It is pointed out that the center-tapped source of direct current incorporated in amplifier 49 is one which is of a proper voltage and capacity for the operation of motor 11, that is, for the proper energization of the windings of motor 11 to cause stepping operation of the output shaft thereof.

Amplifier 49 is of a type required for stepping operation of motor 11. That is, the amplifier supplies at its output terminals a series of pulses of direct current of a first or a second prescribed repetitive four step sequence of varied polarities, and the output shaft of motor 11 is stepped in a first or a second direction according to which of the four step polarity sequences is supplied to the control windings of the motor during any period of operation thereof. The polarity sequence which is so supplied from amplifier 49 is dependent upon the polarity of the direct current supplied across the input terminals of the amplifier. Amplifier 49 may, for example, be the Model CP–100 Conopulse Digital Amplifier manufactured and sold by Conoflow Corporation, 2100 Arch St., Philadelphia, Pa.

By the above description it will be understood by those skilled in the art that regulator 53 is raised or lowered to control the width of glass ribbons 79 according as gage 41 detects deviations in the width of the ribbon from a preset norm or desired width therefor, such gage producing output signals which are variably processed by components 43 and 49, and relays 56 and 57, to produce final output signals which are supplied to motor 11 to step the output shaft thereof in first or second directions to raise or lower the regulator 53, as stated, to increase or decreases the width of ribbon 79 according to the necessary correction detected by gage 41.

While the invention disclosed has been described in conjunction with apparatus used for forming articles or ware from a plastic glass ribbon, it is pointed out that the control system could as well be employed for controlling the width of ribbon formed from hot plastic materials other than glass.

What is claimed is:

1. A system for controlling the width of a ribbon of molten material flowing from the outlet orifice of a furnace or forehearth and formed into said ribbon subsequent to its issuance from the furnace or forehearth, said system comprising, in combination, means for periodically gaging the width of said ribbon and producing variable signals representative of deviations in said width from a preset value therefor, means responsive to said variable signals for producing second signals each having a pulse width proportionate to the time duration of a sequence of the variable signals, amplifying means responsive to each said second signal for producing a sequence of relatively polarized stepping signals each such sequence having a time duration proportionate to the pulse width of the respectively associated second signal, reversible motor means connected to receive said stepping signals and stepped in accordance with said relative polarity and time duration of each said sequence of stepping signals, and means actuated by said motor for controlling the flow of said molten material from said outlet orifice.

2. A control system in accordance with claim 1 in which said variable signals are direct current signals having relative polarities according to the directions of said deviations in the width of said ribbon.

3. A control system in accordance with claim 1 in which said second signals are direct current signals having relative polarities according to the directions of said deviations in the width of said ribbon.

4. A control system in accordance with claim 1 in which said flow control means comprises a regulator movable toward and away from the inner end of said outlet orifice for adjusting the rate of flow therefrom in accordance with the stepping signals received by said motor means.

5. A system in accordance with claim 1 in which said molten material is molten glass.

6. A system for automatically controlling the rate of flow of a molten material from a furnace or forehearth by variably adjusting a flow regulator in accordance with a desired dimension for a ribbon formed from such material following its issuance from said furnace or forehearth, said system comprising, in combination, means for gaging the width of said ribbon as it is being conveyed to be additionaly formed, such means producing direct current output signals which vary in relative polarity and value in accordance with the direction and degree of deviation in the width of said ribbon from a preselected dimension therefor; means receiving said signals and responsive thereto for producing square wave signals having relative polarities in accordance with said directions of width deviation and each having a time duration proportionate to degrees of deviation in excess of a predetermined permissible range of deviation in the width of said ribbon; a reversible stepping motor having its output shaft connected to said flow regulator for adjusting such regulator and, thereby, said rate of flow, such motor being selectively responsive to the polarities of each of a plurality of series of direct current stepping pulses selectively supplied to the input circuits of the motor; and amplifier means connected to said motor input circuits for selectively supplying stepping pulses to such input circuits in accordance with the polarity and duration of square wave signals supplied by said square wave signal producing means to the input circuit of the amplifying means.

7. A control system in accordance with claim 6 in which said square wave signal producing means includes a pair of relays having contacts which control said supply of square wave signals to said amplifying means.

8. A control system in accordance with claim 6 in which said rate of flow is adjusted in accordance with movement of said regulator by said motor nearer to or further from an orifice for issuance of the molten material from said furnace or forehearth.

9. A control system in accordance with claim 6 in which said means for gaging the width of said ribbon comprises a non-contacting type of gage actuated by the emission of infrared rays from the ribbon.

References Cited

UNITED STATES PATENTS

| | | | |
|---|---|---|---|
| 2,116,450 | 5/1938 | Richardson et al. | 65—161 |
| 2,679,749 | 6/1954 | Poole | 65—161 |
| 2,958,160 | 11/1960 | Cooke et al. | 65—161 |
| 3,328,593 | 6/1967 | Johnson et al. | 65—158 |
| 2,265,414 | 12/1941 | Beers et al. | 65—158 |

S. LEON BASHORE, Primary Examiner

E. R. FREEDMAN, Assistant Examiner

U.S. Cl. X.R.

65—158, 163, 164, 199, 201